May 17, 1927.  
J. C. KNAPP  
1,628,788  
TRIPPING DEVICE FOR CAR STANCHIONS  
Filed April 24, 1925 4 Sheets-Sheet 1

Inventor  
John C. Knapp

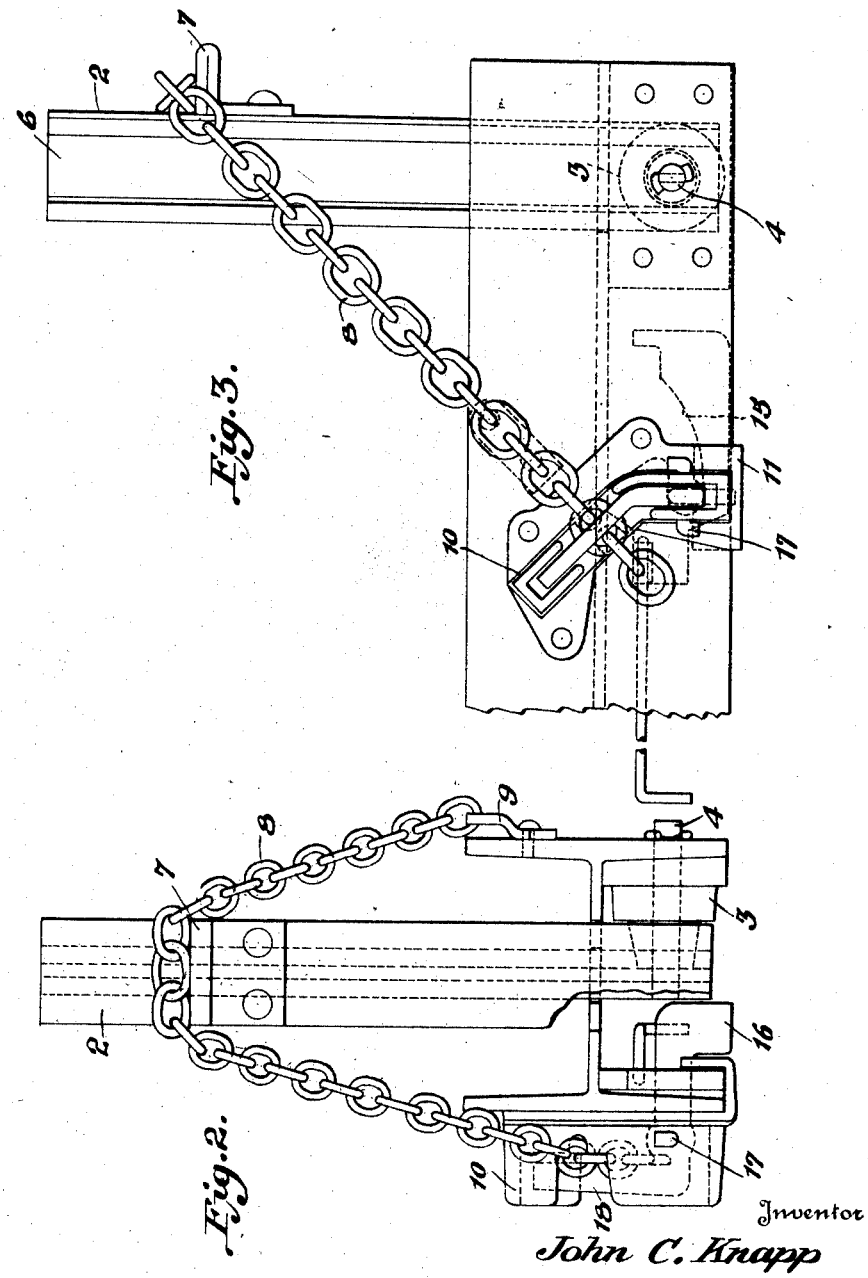

May 17, 1927. 1,628,788
J. C. KNAPP
TRIPPING DEVICE FOR CAR STANCHIONS
Filed April 24, 1925    4 Sheets-Sheet 3
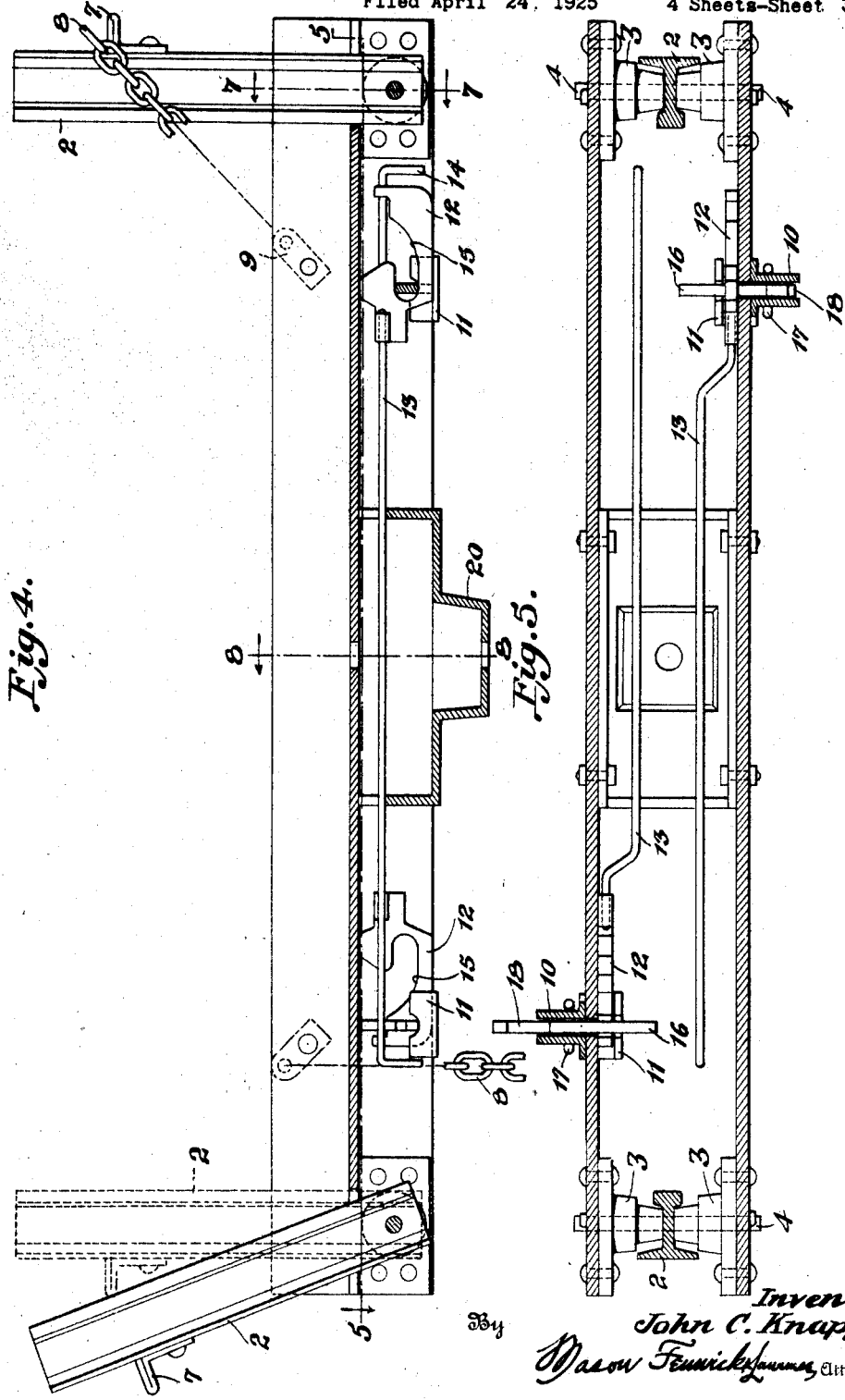
Inventor
John C. Knapp
By Mason Fenwick Lawrence Attorneys

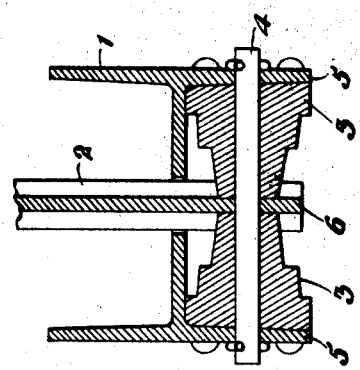
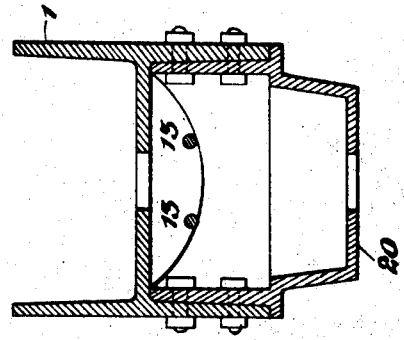
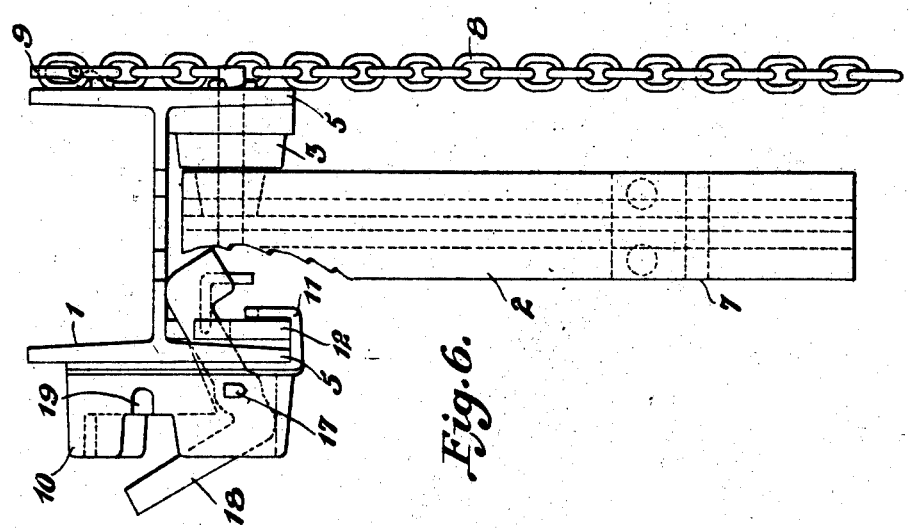

Patented May 17, 1927.

1,628,788

UNITED STATES PATENT OFFICE.

JOHN C. KNAPP, OF ATLANTA, GEORGIA.

TRIPPING DEVICE FOR CAR STANCHIONS.

Application filed April 24, 1925. Serial No. 25,611.

My invention relates to stanchions or stakes commonly used on logging cars, and more particularly to improvements in means for mounting the stanchions, and securing the stanchions in an upright position on the car, together with a device for automatically releasing the stanchion in order to permit unloading of the car, and means for operating the releasing mechanism from the opposite side of the car to that from which it is desired to unload.

Other objects of this invention will appear from the detailed description of claims and drawings forming a part of this application.

In the drawing,

Fig. 2 represents a detailed side elevation view of a part of the logging bunk with the stanchion in an upright and locked position, the stanchion being slightly broken away to disclose the details of trip and locking device.

Fig. 3 shows a detailed end elevation view of a part of the logging bunk with the stanchions in an upright and locked position.

Fig. 4 illustrates an end view of a logging car bunk on a section taken through the web of the I beam upon which the stanchions and tripping devices are mounted.

Fig. 5 represents a sectional plan view of the I beam including stanchions and tripping device taken on line 5—5 of Fig. 4.

Fig. 6 shows an end elevation view of an I beam support for the trunnion, tripping device, and binding chain, all in released position representing the stanchion and chain swinging loose on their supports.

Fig. 7 illustrates an elevation view of the trunnion in relation to the stanchion, and I beam support, taken at line 7—7 of Fig. 4.

Fig. 8 is a sectional view of the centre plate taken at 8—8 of Fig. 4.

Like references numerals indicate like parts in the different views.

Figure 1:
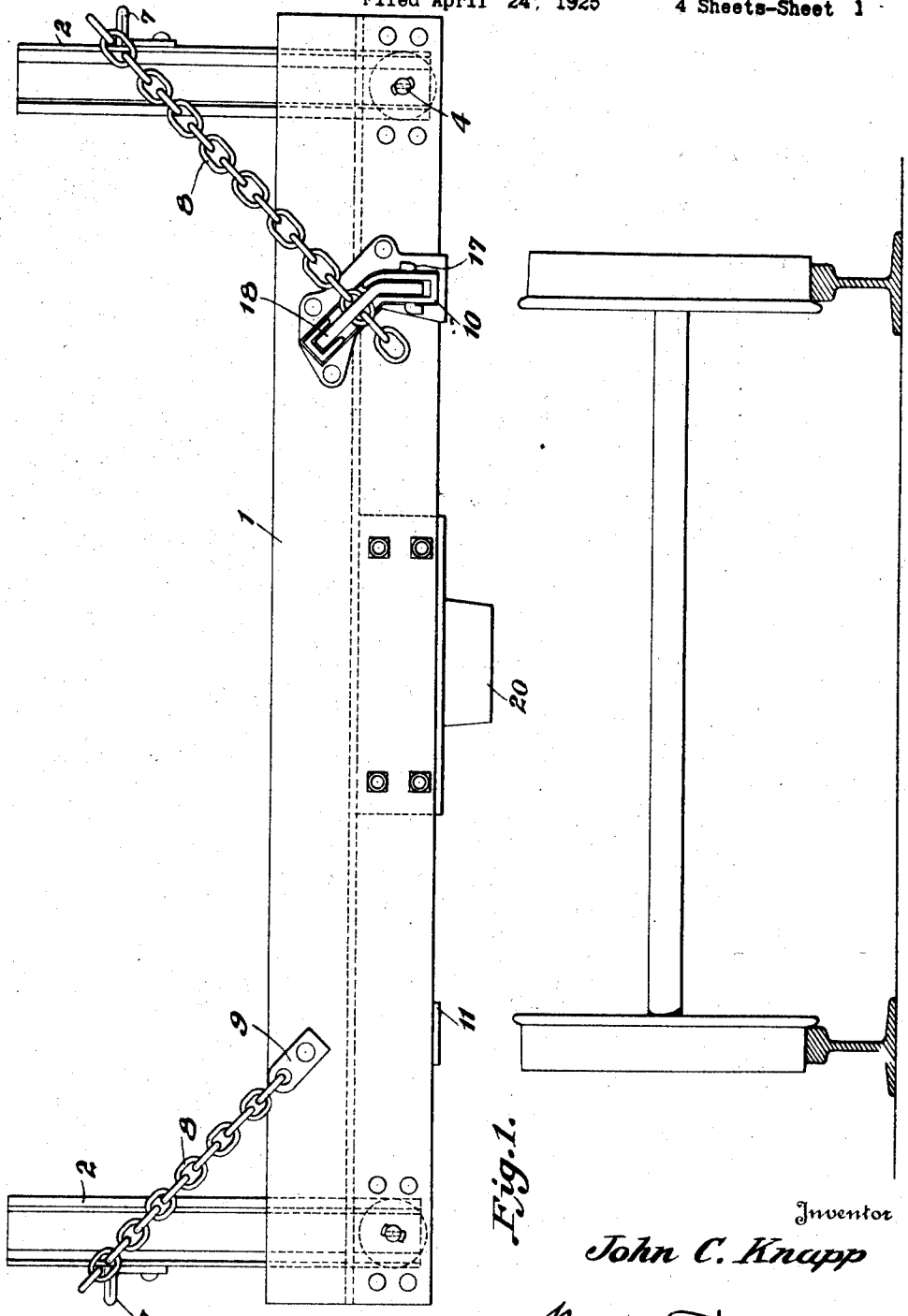
Fig. 1 illustrates an end view of a logging car bunk provided with stanchions and the lock and tripping device described herein.

Numeral 1 designates the supporting beam of an ordinary logging car bunk; this beam may be in the shape of an I, or any other suitable form. For convenience the beam disclosed in the drawing of the application is of an I or H shape. At each end of the beam 1, a stanchion, 2, preferably of rail shape is provided, adapted to be loosely held by trunnions 3, and by a spindle 4 extending through the channel flanges 5 of the beam 1, the trunnion bearings 3, and the centre web 6 of the stanchion 2. At a suitable position on the stanchion 2, an angle iron 7, is riveted to act as a ledge or lug for the chain 8 to rest upon when supporting the stanchion 2 in an upright position, as clearly disclosed in Fig. 3. The chain at one end is loosely and permanently held in place by a lug 9 fastened to one of the flanges 5 of the supporting beam 1. The other end of the chain is adapted to be detachably locked in a tripping device comprising a base plate 10, fastened to the outside of flange 5, and having a hooked portion 11 extending under and upward on the inside of the flanges 5, and of sufficient width at the base of the hooked portion to accommodate a trip plate 12, which is adapted to be operated by means of a trip pull bar 13, from the opposite side of the car, the said pull bar usually having a handle grip as at 14. When the bar 13 is pulled or operated, the trip plate 12, acts by means of the specially designed curve as at 15 to raise the arm 16 of the lock bolt which is pivoted at 17 in the base plate 10, thereby throwing the other arm 18 of the lock bolt outward, and releasing the chain in the groove 19 of the base plate. The numeral 20 designates the center plate of the bunk. The free end of the chain will slip over the base plate when the lock bolt is thrown outward.

This invention provides an efficient means for unloading logs from cars, and assures particularly, quickness, convenience and safety to the person operating, owing to the novel means for releasing the stanchion holding the load from the opposite side of the car. In the invention the stanchion is secured to the bunk by a trunnion device consisting of two trunnion castings, secured to the bunk on the inside of the beam legs with a shaft passing through the legs of the bunk trunnion castings and web of stanchion, which is secured in an upright position for retaining the load by a chain fastened to the bunk on one side, passing at an angle around the stanchion over a ledge thereon to prevent slipping downward, to a locking device secured to the opposite side of bunk.

The locking device consists of a lock bolt pivoted to a base plate shaped to receive a chain in locked relation. The lock bolt is held in position by a trip plate, which has a recess to receive the arm of the lock and bears against the web of the bunk. The trip plate has a pull bar connected thereto, extending between the bottom legs of the bunk to the opposite ends of the bunk on the side of the car. By simply pulling this pull bar, the trip plate automatically releases and opens the lock bolt thereby releasing one end of the stanchion chain permitting the stanchion to fall, and the logs or lading are ready to be removed from the bunk by gravity or otherwise.

The base plate or lock casting at the point of contact with the stanchion chain is shaped so that the stress on the chain operates primarily against the plate.

A further object of this invention is to provide a device whereby the stanchion may be raised and locked from one side of the car only, by raising the stanchion passing the chain around some other ledge into the lock casting and by pulling the trip plate toward the end of the bunk, the counterweight of the lock bolt automatically drops the bolt into position as the trip plate is moved forward.

The preferred form of the invention herein described, is obviously, capable of considerable modification as to details within the scope of the invention.

What I claim is:

1. The combination with a logging car bunk of a stanchion mounted on a trunnion, of a chain supporting the stanchion in position on the trunnion and means for releasably holding the chain, consisting of a bracket attached to the bunk, a bar or latch mounted to swing on the bracket, a countersunk portion in the bracket adapted to hold the chain links, and a trigger on the latch adapted to be automatically operated to lock or release the links.

2. The combination with a logging car bunk of a stanchion mounted on a trunnion, of a chain supporting the stanchion in position on the trunnion, and means for releasably holding the chain, consisting of a bracket attached to the bunk, a bar or latch mounted to swing on the bracket, a countersunk portion in the bracket adapted to hold the chain links, and a trigger on the latch adapted to be automatically operated to lock or release the links, by means of a lever bar operable from the opposite side of the car bunk.

In testimony whereof I affix my signature.

JOHN C. KNAPP.